ns010259169B2

United States Patent
Godon et al.

(10) Patent No.: US 10,259,169 B2
(45) Date of Patent: Apr. 16, 2019

(54) METHOD OF FASTENING STRUCTURAL METAL REINFORCEMENT ON A PORTION OF A GAS TURBINE BLADE MADE OF COMPOSITE MATERIAL, AND AN INJECTION MOLD FOR PERFORMING SUCH A METHOD

(71) Applicant: SAFRAN AIRCRAFT ENGINES, Paris (FR)

(72) Inventors: Thierry Godon, Sevran (FR); Bruno Jacques Gerard Dambrine, Le Chatelet en Brie (FR); Franck Bernard Leon Varin, Voulangis (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 833 days.

(21) Appl. No.: 14/412,532

(22) PCT Filed: Jul. 3, 2013

(86) PCT No.: PCT/FR2013/051576
§ 371 (c)(1),
(2) Date: Jan. 2, 2015

(87) PCT Pub. No.: WO2014/009635
PCT Pub. Date: Jan. 16, 2014

(65) Prior Publication Data
US 2015/0151485 A1    Jun. 4, 2015

(30) Foreign Application Priority Data
Jul. 9, 2012   (FR) ..................... 12 56597

(51) Int. Cl.
*B29C 65/54*   (2006.01)
*B23P 15/04*   (2006.01)
(Continued)

(52) U.S. Cl.
CPC ............ *B29C 65/542* (2013.01); *B23P 15/04* (2013.01); *B29C 45/14008* (2013.01);
(Continued)

(58) Field of Classification Search
CPC .................................................. B29C 65/542
See application file for complete search history.

(56) References Cited

U.S. PATENT DOCUMENTS

2007/0092379 A1   4/2007   Coupe et al.
2008/0075603 A1   3/2008   Van Breugel et al.
(Continued)

FOREIGN PATENT DOCUMENTS

CN   102365161 A   *   2/2012
EP   1 777 063         4/2007
(Continued)

OTHER PUBLICATIONS

English translation of CN 102365161A.*
International Search Report dated Oct. 31, 2013 in PCT/FR13/051576 Filed Jul. 3, 2013.

*Primary Examiner* — Larry W Thrower
(74) *Attorney, Agent, or Firm* — Oblon, McClelland, Maier & Neustadt, L.L.P.

(57) ABSTRACT

A method of fastening structural metal reinforcement on a portion of a gas turbine blade made of composite material and an injection mold for performing the method, the method including positioning the structural metal reinforcement in an injection mold, positioning the portion of the blade onto which the structural metal reinforcement is to be fastened in the injection mold, the portion of the blade and the structural metal reinforcement being positioned relative to each other in their final relative position while leaving between them a gap, injecting adhesive into the gap between the structural metal reinforcement and the portion of the
(Continued)

blade onto which the structural metal reinforcement is to be fastened, and polymerizing the adhesive.

5 Claims, 2 Drawing Sheets

(51) Int. Cl.
*B29C 65/78* (2006.01)
*B29C 65/00* (2006.01)
*F01D 5/28* (2006.01)
*B29C 65/48* (2006.01)
*B29C 45/14* (2006.01)
*B29C 45/16* (2006.01)
*B29C 45/26* (2006.01)
*B32B 37/12* (2006.01)
*B32B 37/16* (2006.01)
*B32B 38/18* (2006.01)
*F04D 29/32* (2006.01)
*B29L 31/08* (2006.01)
*B29K 305/00* (2006.01)
*B29L 9/00* (2006.01)
*B32B 38/00* (2006.01)

(52) U.S. Cl.
CPC .... *B29C 45/14065* (2013.01); *B29C 45/1657* (2013.01); *B29C 45/1671* (2013.01); *B29C 45/2602* (2013.01); *B29C 65/483* (2013.01); *B29C 65/7847* (2013.01); *B29C 66/12461* (2013.01); *B29C 66/301* (2013.01); *B29C 66/532* (2013.01); *B29C 66/721* (2013.01); *B29C 66/72141* (2013.01); *B29C 66/742* (2013.01); *B29C 66/81423* (2013.01); *B29C 66/8221* (2013.01); *B29C 66/83241* (2013.01); *B32B 37/1284* (2013.01); *B32B 37/16* (2013.01); *B32B 38/1858* (2013.01); *F01D 5/282* (2013.01); *F04D 29/324* (2013.01); B29C 65/4835 (2013.01); B29C 2045/14155 (2013.01); B29C 2045/1664 (2013.01); B29K 2305/00 (2013.01); B29L 2009/003 (2013.01); B29L 2031/08 (2013.01); B29L 2031/082 (2013.01); B32B 2038/0076 (2013.01); B32B 2305/08 (2013.01); B32B 2311/18 (2013.01); B32B 2603/00 (2013.01); *F01D 5/288* (2013.01); *F05D 2240/303* (2013.01); *Y02T 50/672* (2013.01); *Y02T 50/673* (2013.01)

(56) References Cited

U.S. PATENT DOCUMENTS

2011/0038732 A1* 2/2011 Huth ................ B29C 70/24
416/229 A
2012/0107129 A1 5/2012 Kulenkampff et al.

FOREIGN PATENT DOCUMENTS

EP  2 353 830  8/2011
WO  2011/006563  1/2011

* cited by examiner

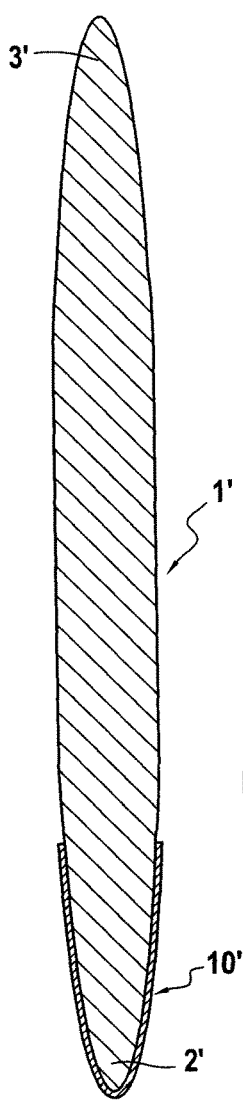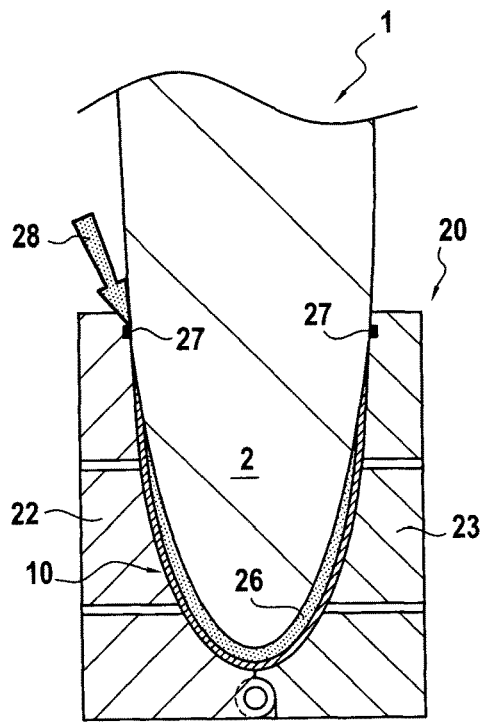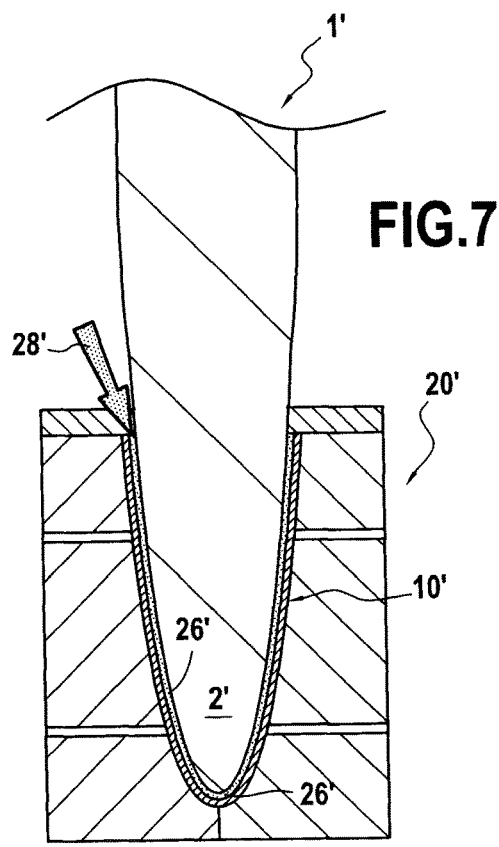

METHOD OF FASTENING STRUCTURAL METAL REINFORCEMENT ON A PORTION OF A GAS TURBINE BLADE MADE OF COMPOSITE MATERIAL, AND AN INJECTION MOLD FOR PERFORMING SUCH A METHOD

BACKGROUND OF THE INVENTION

The present invention relates to the general field of aeroengine gas turbine blades that are made of composite material and that have a leading edge and/or a trailing edge fitted with metal structural reinforcement.

A field of application of the invention is that of turbine engine fan blades or propeller blades. Another field of application of the invention is that of outlet guide vanes (OGV) for turbine engines.

It is known for turbine fan blades that are made of composite material to be fitted with metal structural reinforcement extending over the full height of the blades and beyond their leading edges. The same applies to outlet guide vanes.

Such structural reinforcement enables a set of composite blades to be protected against the fan being struck by a foreign body, such as a bird ingested by the engine, for example. In particular, the metal structural reinforcement serves to protect the leading edge (or the trailing edge) of a composite material blade by avoiding risks of delamination, of fibers breaking, or indeed of damage as a result of loss of cohesion between fibers and the matrix.

In general, the structural reinforcement comprises pieces of titanium made by milling from a block of material, and those pieces are adhesively bonded directly on the outer profile of the blade to be protected.

Nevertheless, adhesively bonding a piece of structural metal reinforcement raises several problems. In particular, it is difficult to obtain a satisfactory thickness of adhesive over all of the areas of contact areas between the metal reinforcement and the blade. Furthermore, with varying viscosity between different batches of adhesive, it is impossible to ensure equal thickness for the layer of adhesive under constant fabrication conditions.

There therefore exists a need to have a method that makes it possible to ensure that structural metal reinforcement can be adhesively bonded onto a blade in reproducible manner, in particular in terms of the layer of adhesive having a well-controlled thickness.

OBJECT AND SUMMARY OF THE INVENTION

In accordance with the invention, this object is achieved by a method of fastening structural metal reinforcement on a portion of a gas turbine blade made of composite material having fiber reinforcement densified by a matrix, the method comprising positioning the structural metal reinforcement in an injection mold, positioning the portion of the blade onto which the structural metal reinforcement is to be fastened in the injection mold, the portion of the blade and the structural metal reinforcement being positioned relative to each other in their final relative position while leaving between them a gap, injecting adhesive into the gap between the structural metal reinforcement and the portion of the blade onto which the structural metal reinforcement is to be fastened, and polymerizing the adhesive.

The fastening method of the invention presents the advantage of being based on a method of filling with resin by using a liquid technique of the liquid composite molding (LCM) type, and more particularly a method of injecting resin of the resin transfer molding (RTM) type or of the vacuum assisted resin transfer molding (VARTM) type so as to bond the structural metal reinforcement adhesively to the blade. Such methods are themselves well known, thus making it possible to ensure good control over the method of fastening the structural metal reinforcement. With this method, it is possible in particular to have good control over the final thickness of the layer of adhesive at all points in the area of contact between the metal reinforcement and the blade. This makes it easy to obtain reproducible adhesive bonding of metal reinforcement on all of the blades of a gas turbine.

The blade may be positioned horizontally or vertically in the injection mold. Likewise, the blade may be positioned in part or in full in the injection mold. As a result, the method of the invention presents great freedom in use.

Preferably, the method further comprises establishing a vacuum in the gap between the structural metal reinforcement and the portion of the blade on which the structural metal reinforcement is to be fastened prior to injecting the adhesive. Establishing a vacuum makes it possible to ensure that the adhesive is distributed in completely uniform manner in the gap.

Also preferably, the structural metal reinforcement is held inside the injection mold by a vacuum or by a suction cup effect. It is thus possible to have an injection mold made of two portions that are hinged to each other, each portion of the mold receiving a respective side flank of the structural metal reinforcement.

The invention also provides the use of the method as defined above for fastening structural metal reinforcement on the leading edge, the trailing edge, or the tip of a fan blade, of a propeller blade, or of an outlet guide vane made of composite material and for use in a turbine engine.

The invention also provides an injection mold for performing the method as defined above, the mold including a location for receiving structural metal reinforcement that is to be fastened on a portion of the blade, and means for holding the structural metal reinforcement in the mold. The mold may comprise two portions that are hinged together by a hinge.

BRIEF DESCRIPTION OF THE DRAWINGS

Other characteristics and advantages of the present invention appear from the following description made with reference to the accompanying drawings, which show embodiments having no limiting character. In the figures:

FIGS. 2 to 5 show different steps of the method in accordance with the invention for fastening the structural metal reinforcement to the leading edge of the FIG. 1 blade;

FIG. 6 is a diagrammatic section view of a structural guide vane made of composite material and having its leading edge covered in structural metal reinforcement; and FIG. 7 shows a step of the method in accordance with the invention for fastening the structural metal reinforcement on the leading edge of the FIG. 6 vane.

DETAILED DESCRIPTION OF THE INVENTION

Figure 1:
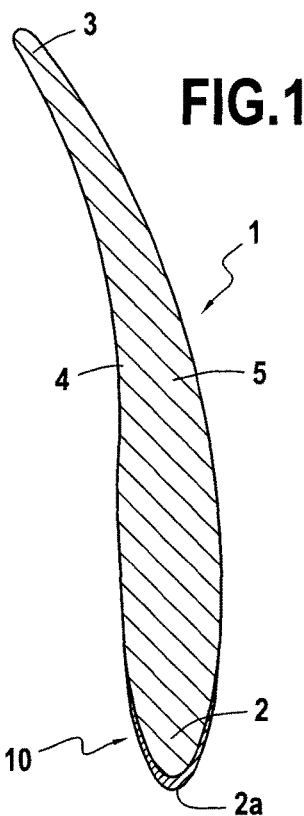
FIG. 1 is a diagrammatic view of a section of a turbine engine fan blade made of composite material having its leading edge covered in structural metal reinforcement.

The invention applies to any gas turbine blade made of composite material for an aeroengine, and in particular it relates to turbine engine fan blades as shown in section in FIG. 1.

In known manner, the fan blade 1 presents an airfoil surface that extends in particular between a leading edge 2 and a trailing edge 3. The airfoil surface of the fan blade also has a pressure side face 4 and a suction side face 5 that form the side faces of the blade interconnecting the leading edge and the trailing edge.

The fan blade 1 is made of composite material with fiber reinforcement densified by a matrix. For example, the blade may be made by three-dimensionally weaving a fiber preform and impregnating the preform with a matrix, the assembly being formed by molding using a vacuum assisted resin injection method of the VARTM type.

The fan blade 1 has structural metal reinforcement 10 that is adhesively bonded to its leading edge 2 and that extends both axially beyond the leading edge of the blade and radially over the entire height of the leading edge (i.e. from the root to the tip of the blade—not shown in FIG. 1).

More precisely, the structural metal reinforcement 10 fits closely to the shape of the leading edge 2 of the blade, which it extends in order to form a metal leading edge 2a. Beyond the leading edge of the blade, the structural metal reinforcement fits closely to portions of the profiles of the pressure side and suction side faces 4 and 5 of the blade.

The structural metal reinforcement 10 presents a right section that is substantially in the form of a rounded V-shape having a base 11 that fits closely to the leading edge 2 of the blade and that is extended by two side flanks 12 and 13 fitting closely to the pressure side face 4 and the suction side face 5 of the blade. Each of the side flanks 12 and 13 of the structural metal reinforcement present a profile that tapers going towards the trailing edge of the blade.

The structural metal reinforcement 10 is a single-piece part that is preferably based on titanium. This material presents great capacity for absorbing the energy due to impacts.

It should be observed that structural metal reinforcement may be fastened in the same manner to the trailing edge of the blade or to the blade tip, instead of or in addition to the structural metal reinforcement fastened to the leading edge.

The structural metal reinforcement 10 is fastened to the leading edge 2 of the fan blade 1 by a fastening method of the invention as described below with reference to FIGS. 2 to 5.

Initially, the structural metal reinforcement 10 for fastening to the leading edge of the fan blade is positioned inside an injection mold 20.

Figure 2:
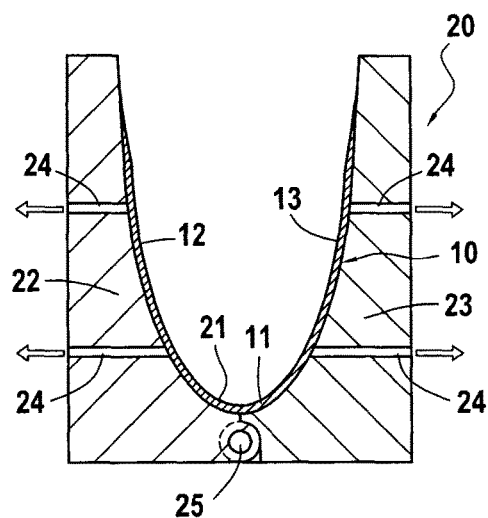

As shown in FIG. 2, the injection mold 20 has an inside surface of profile corresponding substantially to the outside profile of the structural metal reinforcement 10, in particular having a bottom 21 receiving the base 11 of the structural metal reinforcement and two edges 22 and 23 respectively receiving the side flanks 12 and 13 of the reinforcement.

In the example shown in FIGS. 2 to 5, the structural metal reinforcement 10 is held inside the injection mold 20 by establishing a vacuum. For this purpose, the edges 22 and 23 of the injection mold present channels 24 for establishing a vacuum between the inside surface of the injection mold and the outside surface of the structural metal reinforcement so as to ensure that the reinforcement is held inside the injection mold.

Naturally, other means for providing such retention could be envisaged. For example, the inside surface of the injection mold could be provided with suction cups against which the structural metal reinforcement is pressed.

Furthermore, in the presently-described embodiment, the injection mold is made of two portions that are hinged to each other by a hinge 25. In particular, the two hinged portions correspond to the two edges 22 and 23 of the injection mold. Naturally, it is possible to envisage any other type of closure for the injection mold.

Figure 3:
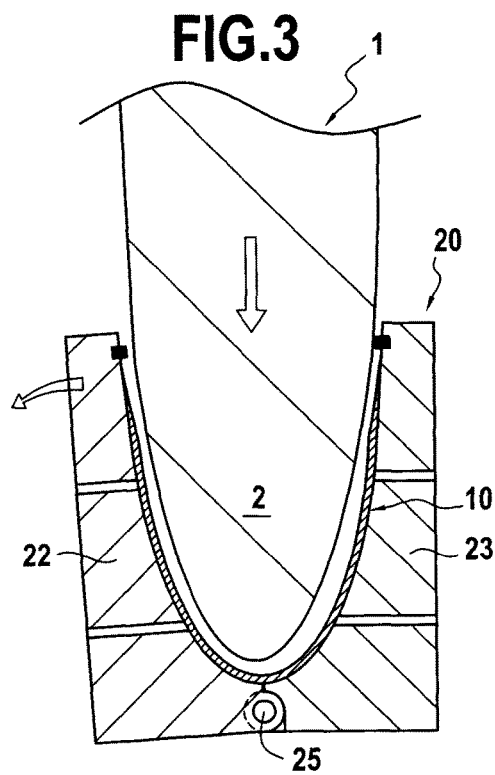
Figure 4:
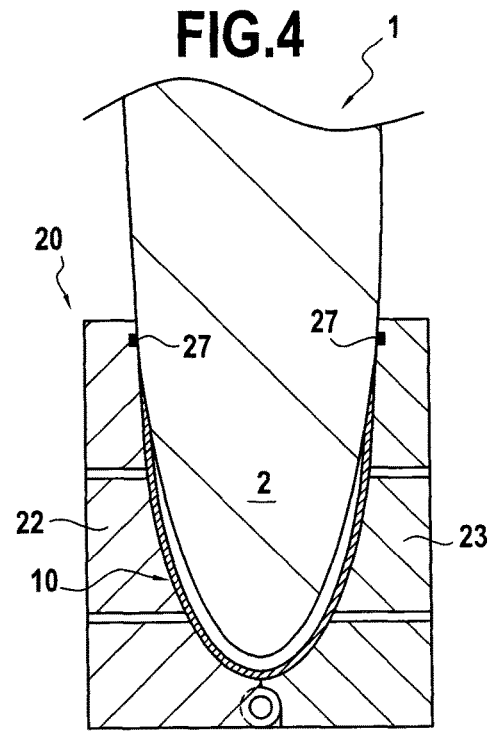

Once the structural metal reinforcement 10 has been properly positioned and held inside the injection mold, the leading edge of the fan blade that is to be covered is put into position. For this purpose, and as shown in FIG. 3, the injection mold 20 is opened (by moving apart the edges 22, 23 so as to enable the leading edge 2 of the blade to be inserted into the injection mold.

The leading edge 2 of the blade is held in this position by engaging the blade in a stationary portion of tooling by means of its root and/or its trailing edge, for example. The injection mold 20 may then be closed by returning its edges 22 and 23 to their initial position.

In this position (FIG. 4), the leading edge 2 of the blade and the structural metal reinforcement are held relative to each other in their final relative position, i.e. leaving between them a gap 26 that is calibrated as a function of the quantity of adhesive that is to be injected.

The following step of the method as shown in FIG. 5 consists in injecting the adhesive into the gap 26 created between the structural metal reinforcement 10 and the leading edge 2 of the blade. For this purpose, a sealing gasket 27 is positioned on the injection mold around the ends of the two side flanks 12 and 13 of the structural metal reinforcement and the adhesive may be injected via any peripheral point of the leading edge of the blade (this adhesive injection point is represented by arrow 28 in FIG. 5). The adhesive fills all of the volume of the gap 26.

Preferably, adhesive is injected after initially establishing a vacuum in the gap 26 between the structural metal reinforcement 10 and the leading edge 2 of the blade so as to ensure that the adhesive is distributed in completely uniform manner.

For this purpose, it is possible to suck out the air from the gap via any peripheral portion of the leading edge of the blade (that is distinct from the adhesive injection point 28). It should be observed that the degree of vacuum inside the gap must not interfere with retention of the structural metal reinforcement inside the injection mold. In particular, this air vacuum should be established while maintaining a pressure gradient between the gap and the space defined between the injection mold and the structural metal reinforcement, and while ensuring that the gradient is sufficient to avoid the structural metal reinforcement separating from the injection mold.

The adhesive that is injected into the gap 26 between the structural metal reinforcement 10 and the leading edge 2 of the blade may be a polymer of the polyester, polyurethane, polyepoxy, bismaleimide, and/or phenolic type, and it may be in the form of a paste.

The adhesive is then polymerized. For example, with an adhesive of epoxy type of 180° C. class, polymerization is performed by raising temperature to 140° C. for 2 hours after injection.

Thereafter, the leading edge of the blade may be unmolded from the injection mold. For this purpose, it may be useful to open the injection mold once more by moving its edges 22 and 23 apart from each other, as described with reference to FIG. 3.

With reference to FIGS. 6 and 7, there follows a description of another implementation of the method of the invention.

In this example, the blade that is to be provided with structural metal reinforcement is a turbine engine outlet guide vane (OGV).

As shown in FIG. 6, the OGV 1' presents an airfoil surface that extends in particular between a leading edge 2' and a trailing edge 3'.

As for the fan blade described above, the OGV 1' is made of composite material and presents structural metal reinforcement 10' that is adhesively bonded to its leading edge 2' and that extends both axially beyond the leading edge of the blade and radially over the full height of the leading edge.

The method of fastening the structural metal reinforcement 10' on the leading edge 2' of the vane 1' is identical to that described above. In particular, it consists mainly in positioning the structural metal reinforcement 10' in an injection mold 20', then in positioning the leading edge 2' of the vane in the injection mold so that the vane and the structural metal reinforcement are positioned relative to each other in their final relative position, while leaving between them a gap 26'. The adhesive can then be injected through an adhesive injection point 28' located at the periphery of the leading edge of the vane. After the adhesive has polymerized, the vane and its leading edge can be unmolded from the injection mold.

Compared with the implementation described with the fan blade, the injection mold used in this implementation is not necessarily made using two portions that are hinged together. Given the non-cambered shape of the OGV, it is not essential to be able to open the injection mold in order to put the leading edge of the vane into position.

There follows a description of characteristics that are common to both above-described implementations.

The blade (a fan blade or an OGV) may be positioned in the injection mold vertically or horizontally depending on requirements. It may also be positioned in part or in full inside the injection mold.

Adhesive may be injected into the gap left between the structural metal reinforcement and the leading edge of the blade via the periphery of the leading edge as shown in the figures or via one of the two radial ends of the structural metal reinforcement. It is also possible to envisage injecting adhesive via one or more holes made through the base of the structural metal reinforcement, with these holes subsequently being plugged (e.g. by laser build-up).

Furthermore, during the step of injecting adhesive into the injection mold, it is possible to bond a film of polyurethane adhesively onto the pressure side and/or suction side faces of the blade. Such a film has the function of protecting the face of the blade it covers against erosion.

In the examples described, structural metal reinforcement is positioned on the leading edge of a blade. Naturally, the same member can be applied likewise to fastening structural metal reinforcement to the trailing edge or to the tip of the blade. In particular, if it is necessary to fix such reinforcement both to the leading edge and to the trailing edge of the blade, these operations may be performed simultaneously using the same injection method. Likewise, the method of the invention applies equally well to propeller blades of an aeroengine of the turboprop type.

The invention claimed is:

1. A method of fastening a structural metal reinforcement on a portion of a gas turbine blade, the method comprising:
   providing the gas turbine blade which is made of composite material having fiber reinforcement already densified by a matrix;
   positioning the structural metal reinforcement in an injection mold;
   positioning the portion of the gas turbine blade onto which the structural metal reinforcement is to be fastened in the injection mold, the portion of the gas turbine blade and the structural metal reinforcement being positioned relative to each other in a final relative position of the portion of the gas turbine blade structural metal reinforcement while leaving a gap between the portion of the gas turbine blade and the structural metal reinforcement;
   injecting adhesive into the gap between the structural metal reinforcement and the portion of the gas turbine blade onto which the structural metal reinforcement is to be fastened; and
   polymerizing the adhesive,
   wherein the adhesive is separate and different from the matrix.

2. A method according to claim 1, further comprising establishing a vacuum in the gap between the structural metal reinforcement and the portion of the gas turbine blade on which the structural metal reinforcement is to be fastened prior to injecting the adhesive.

3. A method according to claim 1, wherein the structural metal reinforcement is held inside the injection mold by a vacuum or by a suction cup effect.

4. A method according to claim 1, wherein the adhesive is a polymer.

5. A method according to claim 1, wherein the structural metal reinforcement presents a rounded V-shape including a base which is extended by side flanks,
   wherein the injection mold includes a bottom which receives the base of the structural metal reinforcement and two edges which receive the side flanks of the structural metal reinforcement, the two edges being movable relative to each other and including channels.

* * * * *